November 5, 1913.

DRAWING 1,703

A careful search has been made this day for the original drawing or a photolithographic copy of the same, for the purpose of reproducing the said drawing to form a part of this book, but at this time nothing can be found from which a reproduction can be made.

Finis D. Morris,
             Chief of Division E.

AWK

UNITED STATES PATENT OFFICE.

E. G. POTTER, OF LEBANON, ILLINOIS.

SPINDLE AND TRUNDLE-HEAD OF MILLS.

Specification of Letters Patent No. 1,703, dated July 18, 1840.

*To all whom it may concern:*

Be it known that I, ELBRIDGE G. POTTER, of Lebanon, in the county of St. Clair and State of Illinois, have invented a new and useful Improvement in Spindles and Trundle-Heads of Mills for the Purpose of Preventing Backlash in Mill-Gears; and I do hereby declare that the following is a full and exact description.

The nature of my invention consists in communicating motion to the spindle by the combination of arms attached to the trundle head and springs attached to the spindle.

To enable others skilled in the art to make and use my invention I will proceed to describe its construction and operation.

I construct my spindle in any of the known forms except at the place where the trundle head is attached to the same which part I make round like the journal or neck except that at the lower part of said journal I make shoulder which projects one inch from the periphery of the journal as shown at A, Figure 3, in the accompanying drawing; and this journal and shoulder I turn true and smooth for the trundle head to rest and move upon. I attach springs to the spindle at 4—4 immediately above the place of the trundle head. These springs I make of 8 pieces of hard wood four feet long four inches wide and half an inch thick four of which I put on one side of the spindle and the other four on the opposite side. I fasten them to the spindle by two bands which are of sufficient size to span the springs when the spindle is between them. I then drive keys between the outer ends of the bands and the side of the springs which fasten them firmly to the spindle as shown at Fig. 1 which is a top view of the springs as B, B, B, B the keys are seen at *c—c* the bands 5—5 the place of the spindle is at 4.

I construct my trundle head in any of the given forms except at the place where it is to be fitted to the spindle. I make the hole round, as seen at A so as to fit the spindle at A. I attach arms to the trundle head as seen at D, D these arms I make of bar iron one and three-fourths of an inch wide and half an inch thick, the outer end of which I turn up so as to form a right angle with the inner part which is eighteen inches long which lies horizontal on the top of the trundle head the outer part is six inches long from the end to the angle which perpendicular one of these arms I fasten on each side of the trundle head in such manner as the upright parts shall be in a line with the center of the spindle as seen at Fig. 2, which is a top view of the trundle head with the arms attached to it.

In combining or uniting the parts I put the trundle head on the spindle. I then attach the springs.

The operation of the improvement is that the springs yield to a superabundance of motion and supply a deficiency thereby absorbing the irregularity of crank or piston motion and causing the gears to run still and regular, preventing entirely the backlash.

What I claim as my invention and desire to secure by Letters Patent is—

The manner of communicating motion to the spindle by the combination of the arms D—D on the trundle head and the springs B B attached to the spindle as herein described and as shown at Fig. 4 which is a perspective view of the combined parts.

E. G. POTTER.

Witnesses:
JOHN STUART,
JOSEPH DESPER.